T. A. GALT & G. S. TRACY.

Stalk-Cutters.

No. 5,233. Reissued Jan. 14, 1873.

Witnesses:
E. M. Bates.
T. A. Connelly

Inventors:
Thomas A. Galt,
George S. Tracy,
Chipman & Simmons
Attorneys

AM. PHOTO-LITHOGRAPHIC CO. N.Y. (OSBORNE'S PROCESS.)

UNITED STATES PATENT OFFICE.

THOMAS A. GALT AND GEORGE S. TRACY, OF STERLING, ILLINOIS.

IMPROVEMENT IN STALK-CUTTERS.

Specification forming part of Letters Patent No. 121,353, dated November 28, 1871; reissue No. 5,233, dated January 14, 1873.

*To all whom it may concern:*

Be it known that we, THOMAS A. GALT and GEORGE S. TRACY, of Sterling, in the county of Whitesides and State of Illinois, have invented a new and valuable Improvement in Corn-Stalk Cutters; and we do hereby declare that the following is a full, clear, and exact description of the construction and operation of the same, reference being had to the annexed drawing making a part of this specification, and to the letters and figures of reference marked thereon.

Figure 1:
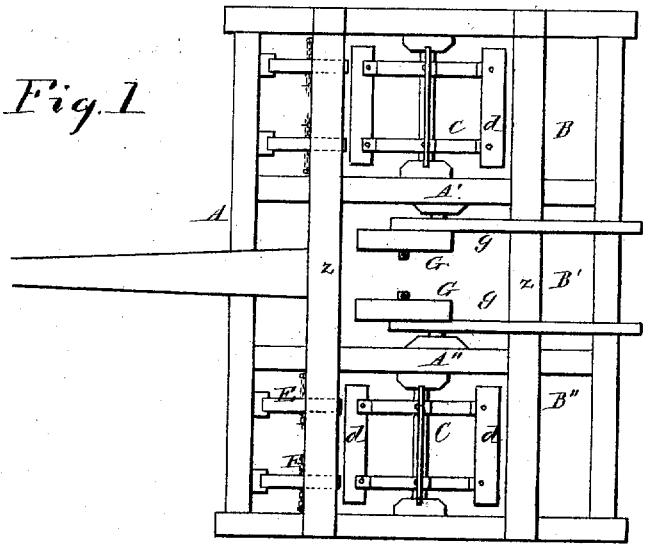
Figure 2:
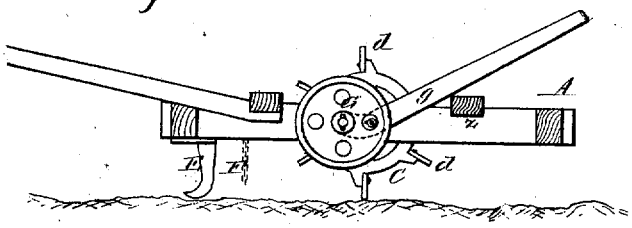

Figure 1 of the drawing is a plan view of our invention. Fig. 2 is a longitudinal vertical section of the same.

This invention has relation to an implement for cutting corn-stalks while the same are lying on the ground; and it consists in the construction and novel arrangement of levers and wheels, whereby the implement may be readily raised from the ground and without much effort transported from place to place, substantially as hereinafter more fully described.

Referring to the drawing, A represents a rectangular frame divided by beams A′ A″ into three sections, B B′ B″. Each of the sections B B″ is provided with a reel or rotary cutter, C, armed with knives *d* and journaled to the sides of the section in which it is arranged. As the implement moves over the ground, the cutters are caused to rotate and their knives to chop the stalks of corn with which they come in contact. E represents hooks hinged to the forward transverse beam of the frame and designed for the purpose of straightening out the corn-stalks in front of the cutters. F designates chains to hold the hooks E when they are raised from the ground. *g* indicates curved levers, which may be pivoted to the beams A′ A″, or to any other suitable part of the frame, between the stop-bars *z z*, and which hold each at its inner end a roller, G.

By elevating the rear ends or handle portions of the levers and moving them forward, the rollers may be lowered. When the rollers are brought in contact with the ground the leverage elevates the frame and cutters, allowing the implement to be moved upon the rollers easily and smoothly. A reverse movement of the levers elevates the rollers and lets the implement down to a position for operation. The levers are supported in their two positions by means of stop-bars *z z*.

The relative arrangement of the levers, rollers, and bars is such as to render the said levers self-locking in either of the positions described.

What we claim as our invention, and desire to secure by Letters Patent, is—

In a corn-stalk cutter having the cutting-reels C and the transverse beams or stop-bars *z*, the lever *g* pivoted between the stop-bars *z* and bearing at the ends of the lower arms the carrying-wheels G, substantially as specified.

In testimony that we claim the above we have hereunto subscribed our names in the presence of two witnesses.

THOMAS A. GALT.
GEO. S. TRACY.

Attest:
I. B. PATTERSON,
GEO. L. WERNTZ.